(12) United States Patent
Milstein

(10) Patent No.: US 8,285,645 B2
(45) Date of Patent: Oct. 9, 2012

(54) REMOTE PRODUCT ORDERING USING MOBILE PHONES

(76) Inventor: Seth M. Milstein, Los Angeles, CA (US)

( * ) Notice: Subject to any disclaimer, the term of this patent is extended or adjusted under 35 U.S.C. 154(b) by 996 days.

(21) Appl. No.: 11/708,973

(22) Filed: Feb. 21, 2007

(65) Prior Publication Data

US 2008/0201267 A1 Aug. 21, 2008

(51) Int. Cl.
*G06F 21/00* (2006.01)
(52) U.S. Cl. .................. 705/52; 705/26.1; 705/26.81
(58) Field of Classification Search .................. 705/52
See application file for complete search history.

(56) References Cited

U.S. PATENT DOCUMENTS

| | | | | |
|---|---|---|---|---|
| 6,085,195 | A * | 7/2000 | Hoyt et al. | 707/10 |
| 6,850,901 | B1 * | 2/2005 | Hunter et al. | 705/26 |
| 7,146,179 | B2 * | 12/2006 | Parulski et al. | 455/456.3 |
| 7,613,443 | B2 * | 11/2009 | Ryu et al. | 455/403 |
| 2003/0018524 | A1 * | 1/2003 | Fishman et al. | 705/14 |
| 2004/0122735 | A1 * | 6/2004 | Meshkin | 705/14 |
| 2005/0222917 | A1 * | 10/2005 | Moore et al. | 705/26 |
| 2005/0277405 | A1 * | 12/2005 | Noguchi | 455/411 |
| 2006/0116167 | A1 * | 6/2006 | Raviv et al. | 455/558 |
| 2007/0061224 | A1 * | 3/2007 | Hofmann et al. | 705/27 |
| 2007/0094135 | A1 * | 4/2007 | Moore et al. | 705/40 |
| 2008/0108299 | A1 * | 5/2008 | Hullot et al. | 455/3.01 |
| 2011/0022499 | A1 * | 1/2011 | Hogan | 705/27.2 |

OTHER PUBLICATIONS

Wireless Application Protol Forum. "WAP MMS Architecture Overview Version Apr. 25, 2001." Apr. 25, 2001. All pages. [http://www.wapforum.org].*
Wireless Application Protol Forum. "Wireless Applicatoin Protocol MMS Encapsulation Protocol Version Jan. 5, 2002." Jan. 5, 2002. All pages. [http://www.wapforum.org].*
Wireless Application Protol Forum. "WAP MMS Client Transactions Version Jan. 15, 2002." Jan. 15, 2002. All pages. [http://www.wapforum.org].*

* cited by examiner

*Primary Examiner* — James A Reagan
*Assistant Examiner* — Calvin Cheung
(74) *Attorney, Agent, or Firm* — Milstein Zhang & Wu LLC; Joseph B. Milstein

(57) ABSTRACT

Systems and methods for placing and fulfilling orders for products that include visual content using a mobile telephone. An image processing operator provides a unique authenticator in return for a monetary payment. A user of the system provides a message that includes a digital image with an order indicator, a delivery address and the unique authenticator. The image processing operator extracts the message components and checks the validity of the authenticator. If the authenticator is valid, the image processor generates the desired image that includes at least a portion of the digital image and a portion of another digital image to produce a completed product. The completed combined image can be provided as any of a digital image, a printed image, and an image rendered on a physical object. The completed product is sent to the user or to a third party as the user directs.

39 Claims, 2 Drawing Sheets

REMOTE PRODUCT ORDERING USING MOBILE PHONES

FIELD OF THE INVENTION

The invention relates to systems and methods of doing business via public networks in general and particularly to a system and method of doing business via public networks that employs unique authenticators for processing image-based material.

BACKGROUND OF THE INVENTION

It is known to process digital images according to a specified ordering protocol. For example, it is common to bring digital images to a photo processor on a machine readable memory and to place an order that those images be rendered as photographs. It is possible to submit images for such processing over a network such as the Internet.

In addition, United States Patent Application Publication No. 2002/0025085A1, published on Feb. 28, 2002, describes systems and methods by which a purchaser is permitted to provide a digital image, at least a portion of which is to be incorporated into a printed product such as a note pad or a greeting card, which printed product can include other visual material such as text and background designs. In the systems and methods of United States Patent Application Publication No. 2002/0025085A1, the purchaser does all of the editing in an interactive manner with a remote computer system. The product is then produced and shipped to the purchaser, or to a designated recipient.

There is a need for systems and methods that allow a purchaser to provide an image of interest, and to place an order for the production of a completed product comprising that image without having to use a computer, and without having to generate the design of the completed product.

SUMMARY OF THE INVENTION

In one aspect, the invention relates to a method of ordering a product having visual content. The method comprises the steps of receiving a unique authenticator; preparing a message that comprises: a digital image of a first physical object, at least a portion of the digital image of the first physical object to be incorporated into a product, the product comprises at least a portion of a digital image of a second physical object; an order designator comprises a prearranged alphanumeric code used to designate a specific product to be ordered; a delivery instruction; and an indicator portion comprises the unique authenticator; and transmitting the message to a receiving address. The method provides a completed product that comprises at least a portion of the digital image of the first physical object combined with at least a portion of the digital image of the second physical object is produced according to the order designator and delivered according to the delivery instruction.

In some embodiments, the unique authenticator comprises one or more alphanumeric characters that are at least compatible with a keypad entry system used a mobile telephone. In some embodiments, the unique authenticator comprises alphanumeric characters provided by use of a selected one of a keyboard, a touchscreen, a stylus, a light pen, a mouse, and a voice command. In some embodiments, the unique authenticator is received in return for a monetary payment. In some embodiments, the monetary payment is a selected one of a payment in cash money, a payment by credit card or by debit card, a payment by transfer from an internet account, and a commitment to make payment against an existing line of credit. In some embodiments, the digital image of the first physical object is a digital image recorded using a selected one of a digital camera, a digital camera portion of a mobile telephone, a digital camera attached to a personal computer, a digital camera attached to a laptop computer, and a mobile device comprises a digital camera. In some embodiments, the order designator comprises an indicator of the digital image of the second physical object to be combined with the at least a portion of the digital image of the first physical object to be incorporated into the product. In some embodiments, the order designator comprises an indicator of an object upon which the at least a portion of the digital image of the first physical object to be combined with the at least a portion of the digital image of the second physical object is to be rendered. In some embodiments, the delivery instruction comprises a selected one of an email address, a telephone number, a postal address, and an address corresponding to a physical location. In some embodiments, the delivery instruction comprises a selected one of delivery to the transmitter of the message and delivery to a third party. In some embodiments, the step of transmitting the message to a receiving address comprises transmission of an electronic message. In some embodiments, the electronic message is a selected one of an email message and a MMS message.

In another aspect, the invention features a method of processing an order for a product having visual content. The method comprises the steps of: providing a unique authenticator; receiving a message that comprises: a digital image of a first physical object, at least a portion of the digital image of the first physical object to be incorporated into a product, the product comprises at least a portion of a digital image of a second physical object; an order designator comprises a prearranged alphanumeric code used to designate a specific product to be ordered; a delivery instruction; and an indicator portion comprises the unique authenticator; and comparing the unique authenticator against a list of one or more valid unique authenticators, to produce a state designated valid if the unique authenticator is found in the list of unique authenticators, and otherwise to produce a state designated invalid. In response to a state designated as valid, the method performs the steps of: processing the digital image according to the order designator to produce a product; and delivering the product according to the delivery instruction. The method provides a completed product that comprises at least a portion of the digital image of the first physical object combined with at least a portion of the digital image of the second physical object is produced and sent according to the delivery instruction.

In some embodiments, the unique authenticator is provided in return for a monetary payment. In some embodiments, the monetary payment is a selected one of a payment in cash money, a payment by credit card or by debit card, a payment by transfer from an internet account, and a commitment to make payment against an existing line of credit. In some embodiments, the unique authenticator comprises one or more alphanumeric characters that are at least compatible with a keypad entry system used a mobile telephone. In some embodiments, the unique authenticator comprises alphanumeric characters provided by use of a selected one of a keyboard, a touchscreen, a stylus, a light pen, a mouse, and a voice command.

In some embodiments, the method further comprises the step of sending a reply message to a transmitter of a message comprises an indicator portion that contains a unique authenticator that produces a state designated invalid.

In some embodiments, the digital image of the first physical object is a digital image recorded using a selected one of a digital camera, a digital camera portion of a mobile telephone, a digital camera attached to a personal computer, a digital camera attached to a laptop computer, and a mobile device comprises a digital camera. In some embodiments, the order designator comprises an indicator of the digital image of the second physical object to be combined with the at least a portion of the digital image of the first physical object to be incorporated into the product. In some embodiments, the order designator comprises an indicator of an object upon which the digital image of the second physical object to be combined with the at least a portion of the digital image of the first physical object is to be rendered. In some embodiments, the delivery instruction comprises a selected one of an email address, a telephone number, a postal address, and an address corresponding to a physical location. In some embodiments, the delivery instruction comprises a selected one of delivery to the transmitter of the message and delivery to a third party. In some embodiments, the step of transmitting the message to a receiving address comprises transmission of an electronic message. In some embodiments, the electronic message is a selected one of an email message and a MMS message.

In some embodiments, the method further comprises the step of marking the unique authenticator as a used, no longer valid, authenticator.

In yet another aspect, the invention provides a system for producing products having visual content. The system comprises: an authenticator generator configured to generate one or more unique authenticators; a memory module comprises a module configured to record one or more valid unique authenticators and a module configured to record one or more used, no longer valid unique authenticators; a message receiver and decoder module configured to receive an electronic message and to extract from the electronic message: a digital image of a first physical object, at least a portion of the digital image of the first physical object to be incorporated into a product, the product comprises at least a portion of a digital image of a second physical object; an order designator comprises a prearranged alphanumeric code used to designate a specific product to be produced; a delivery instruction; and an indicator portion comprises a purported unique authenticator; an authenticator comparison module configured to compare the purported unique authenticator against the one or more valid unique authenticators, to produce a state designated valid if the purported unique authenticator is found among the one or more valid unique authenticators, and otherwise to produce a state designated invalid; an authenticator updating module configured to change the status of a matched valid unique authenticator in memory to a used, no longer valid unique authenticator in response to the designation of a purported unique authenticator as valid; and an order fulfillment module that produces a completed product comprises at least a portion of the digital image of the first physical object combined with at least a portion of the digital image of the second physical object, and that sends the completed product according to the delivery instruction.

In some embodiments, the one or more unique authenticators comprise one or more alphanumeric characters that are compatible with the keypad entry system used a mobile telephone. In some embodiments, the one or more unique authenticators comprise alphanumeric characters provided by use of a selected one of a keyboard, a touchscreen, a stylus, a light pen, a mouse, and a voice command.

In some embodiments, the system further comprises a communication module that sends a reply message to a transmitter of a message comprises an indicator portion that contains a purported unique authenticator that produces a state designated invalid.

In some embodiments, the digital image of the first physical object is a digital image recorded using a selected one of a digital camera, a digital camera portion of a mobile telephone, a digital camera attached to a personal computer, a digital camera attached to a laptop computer, and a mobile device comprises a digital camera. In some embodiments, the order designator comprises an indicator of the digital image of the second physical object to be combined with the at least a portion of the digital image of the first physical object to be incorporated into the product. In some embodiments, the order designator comprises an indicator of an object upon which the digital image of the second physical object to be combined with the at least a portion of the digital image of the first physical object is to be rendered. In some embodiments, the delivery instruction comprises a selected one of an email address, a telephone number, a postal address, and an address corresponding to a physical location. In some embodiments, the delivery instruction comprises a selected one of delivery to the transmitter of the message and delivery to a third party. In some embodiments, the electronic message is a selected one of an email message and a MMS message.

In some embodiments, the system further comprises a transaction processing module that issues a unique authenticator in exchange for a monetary payment. In some embodiments, the monetary payment is a selected one of a payment in cash money, a payment by credit card or by debit card, a payment by transfer from an internet account, and a commitment to make payment against an existing line of credit.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

The present invention provides systems and methods for a purchaser to provide a digital image of a physical object, such as a person, and to have that image manipulated to create a composite image of the person in association with a second physical object. By way of example, a purchaser can provide a digital image of himself or herself to be combined with a second digital image of a second object, such as a specialty vehicle, so as to produce a completed product comprising an image depicting the person as the driver of the specialty vehicle. The completed product can be a digital image for display on an electronic display, such as a telephone display, a television or a computer monitor, a printed image such a postcard, an article of clothing such as a tee shirt comprising an image rendered thereon, or an object such as a coffee cup comprising an image rendered thereon. Many other possible renderings of such an image will become apparent as the present disclosure is read and understood.

Figure 1:
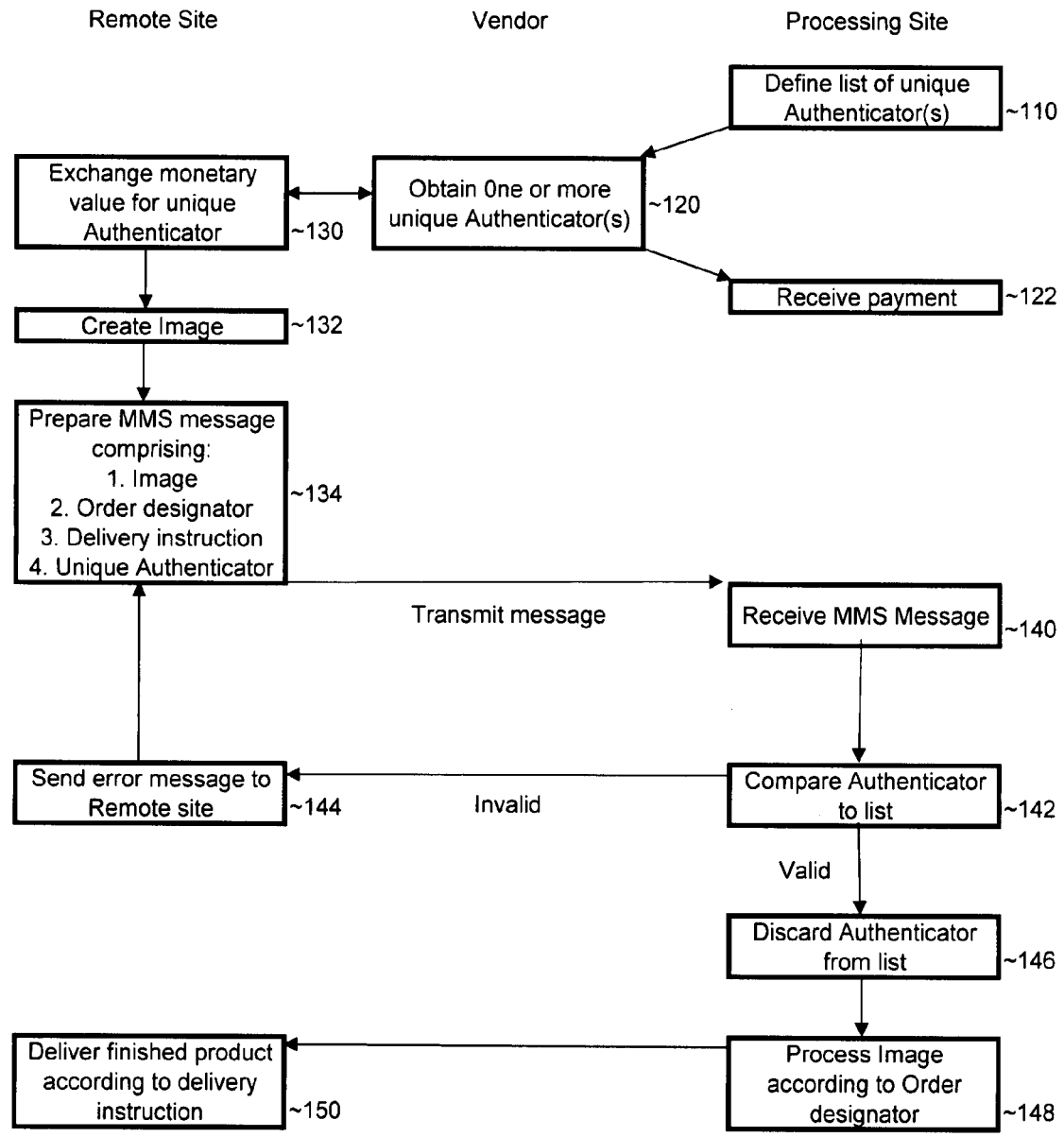
FIG. 1 is an illustrative flow diagram that can be used to explain the process of providing images according to the invention, and can also be understood to explain in overview how the system of the invention is constructed.

FIG. 1 is an illustrative flow diagram that can be used to explain the process of providing images according to the invention, and can also be understood to explain in overview how the system of the invention is constructed. In FIG. 1, there are at least two entities who participate, and there can in some embodiments be three participating entities. On the right side of FIG. 1 under the heading "Processing Site" are actions taken by an entity that performs the image processing that results in a completed product. On the left side of FIG. 1 under the heading "Remote Site" are actions taken by a user or a purchaser of the process performed and product created by the entity that controls the processing site. The term Remote Site is used because the user or purchaser can be situated at a distance from the processing site, and in some embodiments communicates with the processing site by cellular telephone or mobile telephone. In the center portion of FIG. 1 is a heading "Vendor" that represents an entity that interacts with the user or purchaser at the remote site. In some embodiments, the vendor is a third party that has a business relationship with the entity that operates the processing site. In some embodiments, the vendor is an owner of property that can be imaged (for example, a car, an airplane, a building, or other personal or real property). In some embodiments, the vendor and the processing site are the same entity, or entities owned by the same owner.

The process illustrated in FIG. 1 involves the definition of alphanumeric strings that will be called authenticators. In one embodiment, the alphanumeric strings comprise symbols that can be entered into an electronic message using the keys of a mobile telephone. For example, many mobile telephones allow a user to enter letters (e.g., as either upper case or lower case letters), numbers, and punctuation and other symbols such as left and right parentheses, ampersand, exclamation mark, and others. For example, using 7 bits, many such alphanumeric and other symbols can be represented as ASCII characters as shown in Table I.

TABLE I

| Dec | Hx | Oct | Char | Dec | Hx | Oct | Html | Chr | Dec | Hx | Oct | Html | Chr | Dec | Hx | Oct | Html | Chr |
|---|---|---|---|---|---|---|---|---|---|---|---|---|---|---|---|---|---|---|
| 0 | 0 | 000 | NUL (null) | 32 | 20 | 040 |   | Space | 64 | 40 | 100 | @ | @ | 96 | 60 | 140 | ` | ` |
| 1 | 1 | 001 | SOH (start of heading) | 33 | 21 | 041 | ! | ! | 65 | 41 | 101 | A | A | 97 | 61 | 141 | a | a |
| 2 | 2 | 002 | STX (start of text) | 34 | 22 | 042 | " | " | 66 | 42 | 102 | B | B | 98 | 62 | 142 | b | b |
| 3 | 3 | 003 | ETX (end of text) | 35 | 23 | 043 | # | # | 67 | 43 | 103 | C | C | 99 | 63 | 143 | c | c |
| 4 | 4 | 004 | EOT (end of transmission) | 36 | 24 | 044 | $ | $ | 68 | 44 | 104 | D | D | 100 | 64 | 144 | d | d |
| 5 | 5 | 005 | ENQ (enquiry) | 37 | 25 | 045 | % | % | 69 | 45 | 105 | E | E | 101 | 65 | 145 | e | e |
| 6 | 6 | 006 | ACK (acknowledge) | 38 | 26 | 046 | & | & | 70 | 46 | 106 | F | F | 102 | 66 | 146 | f | f |
| 7 | 7 | 007 | BEL (bell) | 39 | 27 | 047 | ' | ' | 71 | 47 | 107 | G | G | 103 | 67 | 147 | g | g |
| 8 | 8 | 010 | BS (backspace) | 40 | 28 | 050 | ( | ( | 72 | 48 | 110 | H | H | 104 | 68 | 150 | h | h |
| 9 | 9 | 011 | TAB (horizontal tab) | 41 | 29 | 051 | ) | ) | 73 | 49 | 111 | I | I | 105 | 69 | 151 | i | i |
| 10 | A | 012 | LF (NL line feed, new line) | 42 | 2A | 052 | * | * | 74 | 4A | 112 | J | J | 106 | 6A | 152 | j | j |
| 11 | B | 013 | VT (vertical tab) | 43 | 2B | 053 | + | + | 75 | 4B | 113 | K | K | 107 | 6B | 153 | k | k |
| 12 | C | 014 | FF (NP form feed, new page) | 44 | 2C | 054 | , | , | 76 | 4C | 114 | L | L | 108 | 6C | 154 | l | l |
| 13 | D | 015 | CR (carriage return) | 45 | 2D | 055 | - | - | 77 | 4D | 115 | M | M | 109 | 6D | 155 | m | m |
| 14 | E | 016 | SO (shift out) | 46 | 2E | 056 | . | . | 78 | 4E | 116 | N | N | 110 | 6E | 156 | n | n |
| 15 | F | 017 | SI (shift in) | 47 | 2F | 057 | / | / | 79 | 4F | 117 | O | O | 111 | 6F | 157 | o | o |
| 16 | 10 | 020 | DLE (data link escape) | 48 | 30 | 060 | 0 | 0 | 80 | 50 | 120 | P | P | 112 | 70 | 160 | p | p |
| 17 | 11 | 021 | DC1 (device control 1) | 49 | 31 | 061 | 1 | 1 | 81 | 51 | 121 | Q | Q | 113 | 71 | 161 | q | q |
| 18 | 12 | 022 | DC2 (device control 2) | 50 | 32 | 062 | 2 | 2 | 82 | 52 | 122 | R | R | 114 | 72 | 162 | r | r |
| 19 | 13 | 023 | DC3 (device control 3) | 51 | 33 | 063 | 3 | 3 | 83 | 53 | 123 | S | S | 115 | 73 | 163 | s | s |
| 20 | 14 | 024 | DC4 (device control 4) | 52 | 34 | 064 | 4 | 4 | 84 | 54 | 124 | T | T | 116 | 74 | 164 | t | t |
| 21 | 15 | 025 | NAK (negative acknowledge) | 53 | 35 | 065 | 5 | 5 | 85 | 55 | 125 | U | U | 117 | 75 | 165 | u | u |
| 22 | 16 | 026 | SYN (synchronous idle) | 54 | 36 | 066 | 6 | 6 | 86 | 56 | 126 | V | V | 118 | 76 | 166 | v | v |
| 23 | 17 | 027 | ETB (end of trans. block) | 55 | 37 | 067 | 7 | 7 | 87 | 57 | 127 | W | W | 119 | 77 | 167 | w | w |
| 24 | 18 | 030 | CAN (cancel) | 56 | 38 | 070 | 8 | 8 | 88 | 58 | 130 | X | X | 120 | 78 | 170 | x | x |
| 25 | 19 | 031 | EM (end of medium) | 57 | 39 | 071 | 9 | 9 | 89 | 59 | 131 | Y | Y | 121 | 79 | 171 | y | y |
| 26 | 1A | 032 | SUB (substitute) | 58 | 3A | 072 | : | : | 90 | 5A | 132 | Z | Z | 122 | 7A | 172 | z | z |
| 27 | 1B | 033 | ESC (escape) | 59 | 3B | 073 | ; | ; | 91 | 5B | 133 | [ | [ | 123 | 7B | 173 | { | { |
| 28 | 1C | 034 | FS (file separator) | 60 | 3C | 074 | < | < | 92 | 5C | 134 | \ | \ | 124 | 7C | 174 | | | \| |
| 29 | 1D | 035 | GS (group separator) | 61 | 3D | 075 | = | = | 93 | 5D | 135 | ] | ] | 125 | 7D | 175 | } | } |
| 30 | 1E | 036 | RS (record separator) | 62 | 3E | 076 | > | > | 94 | 5E | 136 | ^ |   | 126 | 7E | 176 | ~ | ~ |
| 31 | 1F | 037 | US (unit separator) | 63 | 3F | 077 | ? | ? | 95 | 5F | 137 | _ | _ | 127 | 7F | 177 |  | DEL |

Source: www.LookupTables.com

The unique authenticators can be any convenient length. For example, an authenticator comprising 30 alphanumeric symbols or characters selected from only the ASCII code elements designated by decimal 32 through decimal 126 would provide 3095 possible unique combinations, or $395 \times 10^{95} = 2.18 \times 10^{45} \times 10^{95} = 2.18 \times 10^{140}$, or 218 followed by 138 zeros, a rather large number. Each 30 character authenticator could be generated using a random number generator, and could be represented by $30 \times 7$ bits or 210 bits=27 bytes of 8 bits each, with 4 extra bits available as flags. One of the flag bits can be used to define whether a specific authenticator is valid (for example by setting the bit to value 0, or "off") or whether the authenticator is an authenticator that has been used, and should be considered invalid (for example by changing the flag bit to value 1, or "on"). The unique authenticators can be generated when needed or can be generated prior to being needed, and can be stored in a machine readable memory module. The memory can comprise two portions, a module containing valid authenticators, and a module containing used, no longer valid, authenticators. The two portions can be separate (for example by defining separate memory areas based on starting addresses or separate memory devices), or they can be intermingled, in which case all authenticators of either type (valid or invalid) are placed in memory in any convenient order, and the appropriate flag bit is used to determine which type (valid or invalid) any specific authenticator happens to be at any given time. A search for a specific authenticator having a defined number of characters or symbols will be understood to return a state indicated by the flag bit (valid or invalid) for an authenticator that is identified as present in the memory. For completeness, a search for a specific authenticator having a defined number of characters or symbols that fails to identify any matching authenticator will be understood to produce a designation of invalid. As indicated by the box 110 identified as Define list of valid Authenticator(s), an authenticator generator generates at least one authenticator having a flag bit set to return "valid" and places it in memory.

If a vendor is a participant in a transaction, the vendor obtains one or more unique authenticators from the processing site, as indicated at box 120. The authenticators are valid authenticators. They can be provided to the vendor in any convenient manner, such as provision of a printed list, provision of electronic strings of characters by a secure electronic communication, or provision of authenticators recorded on a machine readable medium such as an optical memory (e.g., CD-ROM or DVD of any conventional type), a semiconductor memory (such as a semiconductor memory device having a USB interface), or a magnetic memory such as a floppy disc or hard drive.

As indicated by the bidirectional arrow connecting box 120 to box 130, designated "Exchange monetary value for unique Authenticator", a user or purchaser a product according to the systems and methods of the invention pays an agreed monetary amount to the vendor in return for a valid unique authenticator. In some embodiments, the monetary payment is a selected one of a payment in cash money, a payment by credit card or by debit card, a payment by transfer from an internet account, and a commitment to make payment against an existing line of credit. In most embodiments, the vendor ultimately transfers a payment to the entity operating the processing site, as indicated at box 122, designated "Receive payment." In some embodiments, an authenticator may be provided for free (e.g., as a complementary service) to show potential customers or potential commercial partners (e.g., potential vendors) how the system operates.

The user or purchaser creates a digital image, as shown in box 132. The digital image can be generated before or after the use obtains the unique authenticator. That is, it is irrelevant at what time the user generates or obtains the image that the user ultimately uses according to box 134 (to be discussed shortly). In some embodiments, the image is that of a physical object. In some embodiments, the image is that of a person. In some embodiments, the digital image is recorded using a selected one of a digital camera, a digital camera portion of a mobile telephone, a digital camera attached to a personal computer, a digital camera attached to a laptop computer, and a mobile device comprising a digital camera.

The user or purchaser creates a message containing at least four components, as indicated at box 134. The components are the digital image of a first physical object, an order designator comprising a prearranged alphanumeric code used to designate a specific product to be ordered, a delivery instruction, and an indicator portion comprising the unique authenticator. At least a portion of the digital image of the first physical object will be incorporated into a product. The product comprises at least a portion of a digital image of a second physical object that is combined with the portion of the first image. In some embodiments, the message is a Multimedia Messaging Service (MMS) message. MMS is a way to send a message from one mobile device to another. MMS can include text, sound, images and video. It is also possible to send MMS messages from a mobile phone to an email address. Formats that can be embedded within MMS include: Text (formatted with fonts, colors, etc), images (such as JPEG and GIF format), audio (for example MP3 and MIDI format) and video (such as MPEG). In other embodiments, the message is an email message with attached files as needed to transmit the required content. In principle, any messaging system that can transmit the required content can be used.

The user transmits the message to the processing site, as indicated by the arrow from box 134 to box 140. At the processing site, there is a message receiver and decoder module that is configured to receive an electronic message and to extract the four components of the message from the electronic message. The process of receiving the message (and the associated module) is represented by the box 140. At the processing site, the four components (a digital image of a first physical object, an order designator comprising a prearranged alphanumeric code used to designate a specific product to be produced, a delivery instruction, and an indicator portion of the message comprising a purported unique authenticator) are recovered from the message. This is accomplished using conventional hardware and software configured to extract such information from a message of the type transmitted by the user or purchaser.

At box 142, an authenticator comparison module compares the purported unique authenticator against the list of one or more valid unique authenticators. The comparison process produces a state designated valid if the purported unique authenticator is found among the one or more valid unique authenticators in the memory module, and produces a state designated invalid otherwise, as described above.

In the event that the state produced is designated invalid (corresponding to the arrow from box 142 to box 144), the processing site can send a message to the user or purchaser that there was an error in the content of the message that was transmitted, and that corrective action should be taken, as shown by box 144. The user or purchaser can then create a corrected message and send that message, as indicated by box 134. Given the many possible configurations of valid authenticators (assuming 30 character length), it would be quite difficult for a user to guess a string corresponding to a valid authenticator, so there is only a small chance that a user can send a correctly prepared message that would result in a designation of valid using an authenticator string that was not obtained legitimately.

In the event that the state produced is designated valid (corresponding to the arrow from box 142 to box 146), a series of events occurs. As regards the valid authenticator, an authenticator updating module changes the status of a matched valid unique authenticator in memory to a used, no longer valid unique authenticator in response to the designation of a purported unique authenticator as valid. This can be performed as simply as changing a flag bit in the authenticator, or it can be performed in a more complex process of moving the authenticator to a memory area designated for used, no longer valid authenticators. In either case, the authenticator generator 110 previously described can compare a newly generated proposed authenticator against both the list of valid authenticators and the list of used, no longer valid authenticators to make certain that the newly generated proposed authenticator is unique, and is not a duplicate of a previously generated authenticator. If the newly generated proposed authenticator is unique, it is retained in memory, and if it is not unique, it is discarded. Another way to prepare and use unique authenticators is to generate one or more authenticators as one or more digital strings having a suitable number of bits and corresponding to a series of acceptable symbols (such as ASCII 32 through ASCII 126), where the successive strings differ in at least one ASCII character in a given location in the string, and then randomly selecting one such digital string for transmission to a user in return for monetary value, as indicated at box 130. In any method that is used in the systems and methods according to the invention, used authenticators are recorded in memory with an indication that they are no longer available for use.

As indicated at box 148, an order fulfillment module produces a completed product comprising at least a portion of the digital image of the first physical object combined with at least a portion of the digital image of the second physical object.

The order fulfillment module uses the order designator to determine what the completed product should be. The order designator includes an indicator of the digital image of the second physical object to be combined with the at least a portion of the digital image of the first physical object to be incorporated into the product. The order designator also includes an indicator of an object upon which the digital image of the second physical object to be combined with the at least a portion of the digital image of the first physical object is to be rendered. As mentioned earlier, the combined image can be rendered in any of many different formats, such as a pure digital image for display on an electronic display, an image printed on paper, an image rendered on an object such as an article of clothing or a drinking cup.

As indicated at box 150, the order fulfillment module sends the completed product according to the delivery instruction. In some embodiments, the delivery instruction is a selected one of an email address, a telephone number, a postal address (such as a post office box), and an address corresponding to a physical location, such as a street address and possibly a designator of an apartment or a unit, a floor, or a specific entity situated at the street address. In some embodiments, the delivery instruction comprises a selected one of delivery to the transmitter of the message (that is, the user or purchaser) and delivery to a third party.

Figure 2:
FIG. 2 is an illustrative image of a completed product, comprising a portion of a first image of a person and a portion of a second image of a motor vehicle, according to principles of the invention.

FIG. 2 is an illustrative image of a completed product, comprising a portion of a first image (that of a person) and a portion of a second image (that of a motor vehicle). Specifically, FIG. 2 is a combined image that depicts the inventor as the driver of a racing car. The image of FIG. 2 can be transmitted as an electronic image (for example in bmp format, although any convenient image format can be used), as a printed image (e.g., as a postcard), or as an image on a physical object.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Many functions of electrical and electronic apparatus can be implemented in hardware modules (for example, hard-wired logic), in software modules (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A method of ordering a product having visual content, comprising the steps of:
   receiving a unique authenticator;
   preparing a message comprising:
      a digital image of a first physical object, at least a portion of said digital image of said first physical object to be incorporated into a product, said product comprising at least a portion of a digital image of a second physical object;
      an order designator comprising a prearranged alphanumeric code used to designate a specific product to be ordered;
      a delivery instruction; and
      an indicator portion comprising said unique authenticator;
   transmitting said message using a cellular telephone or a mobile telephone to a receiving address; and
   receiving a completed product, said completed product comprising at least a portion of said digital image of said first physical object combined with at least a portion of said digital image of said second physical object rendered on a physical object.

2. The method of ordering a product having visual content of claim 1, wherein said unique authenticator comprises one or more alphanumeric characters that are at least compatible with a keypad entry system used a mobile telephone.

3. The method of ordering a product having visual content of claim 1, wherein said unique authenticator comprises alphanumeric characters provided by use of a selected one of a keyboard, a touchscreen, a stylus, a light pen, a mouse, and a voice command.

4. The method of ordering a product having visual content of claim 1, wherein said unique authenticator is received in return for a monetary payment.

5. The method of ordering a product having visual content of claim 4, wherein said monetary payment is a selected one of a payment in cash money, a payment by credit card or by debit card, a payment by transfer from an internet account, and a commitment to make payment against an existing line of credit.

6. The method of ordering a product having visual content of claim 1, wherein said digital image of said first physical object is a digital image recorded using a selected one of a digital camera, a digital camera portion of a mobile telephone, a digital camera attached to a personal computer, a digital camera attached to a laptop computer, and a mobile device comprising a digital camera.

7. The method of ordering a product having visual content of claim 1, wherein said order designator comprises an indicator of said digital image of said second physical object to be combined with said at least a portion of said digital image of said first physical object to be incorporated into said product.

8. The method of ordering a product having visual content of claim 1, wherein said order designator comprises an indicator of an object upon which said at least a portion of said digital image of said first physical object to be combined with said at least a portion of said digital image of said second physical object is to be rendered.

9. The method of ordering a product having visual content of claim 1, wherein said delivery instruction comprises a selected one of an email address, a telephone number, a postal address, and an address corresponding to a physical location.

10. The method of ordering a product having visual content of claim 1, wherein said delivery instruction comprises a selected one of delivery to a purchaser and delivery to a third party.

11. The method of ordering a product having visual content of claim 1, wherein said step of transmitting said message to a receiving address comprises transmission of an electronic message.

12. The method of ordering a product having visual content of claim 11, wherein said electronic message is a selected one of an email message and a MMS message.

13. A method of processing an order for a product having visual content, comprising the steps of:
providing a unique authenticator;
receiving a message communicated by cellular telephone or mobile telephone, said message comprising:
a digital image of a first physical object, at least a portion of said digital image of said first physical object to be incorporated into a product, said product comprising at least a portion of a digital image of a second physical object;
an order designator comprising a prearranged alphanumeric code used to designate a specific product to be ordered;
a delivery instruction; and
an indicator portion comprising said unique authenticator;
comparing said unique authenticator against a list of one or more valid unique authenticators, to produce a state designated valid if said unique authenticator is found in the list of unique authenticators, and otherwise to produce a state designated invalid;
in response to a state designated as valid, performing the steps of:
processing said digital image according to said order designator to produce a physical product having rendered thereon at least a portion of said digital image of said first physical object combined with at least a portion of said digital image of said second physical object; and
delivering said product according to said delivery instruction.

14. The method of processing an order for a product having visual content of claim 13, wherein said unique authenticator is provided in return for a monetary payment.

15. The method of processing an order for a product having visual content of claim 14, wherein said monetary payment is a selected one of a payment in cash money, a payment by credit card or by debit card, a payment by transfer from an internet account, and a commitment to make payment against an existing line of credit.

16. The method of processing an order for a product having visual content of claim 13, wherein said unique authenticator comprises one or more alphanumeric characters that are at least compatible with a keypad entry system used a mobile telephone.

17. The method of processing an order for a product having visual content of claim 13, wherein said unique authenticator comprises alphanumeric characters provided by use of a selected one of a keyboard, a touchscreen, a stylus, a light pen, a mouse, and a voice command.

18. The method of processing an order for a product having visual content of claim 13, further comprising the step of sending a reply message to a transmitter of a message comprising an indicator portion that contains a unique authenticator that produces a state designated invalid.

19. The method of processing an order for a product having visual content of claim 13, wherein said digital image of said first physical object is a digital image recorded using a selected one of a digital camera, a digital camera portion of a mobile telephone, a digital camera attached to a personal computer, a digital camera attached to a laptop computer, and a mobile device comprising a digital camera.

20. The method of processing an order for a product having visual content of claim 13, wherein said order designator comprises an indicator of said digital image of said second physical object to be combined with said at least a portion of said digital image of said first physical object to be incorporated into said product.

21. The method of processing an order for a product having visual content of claim 13, wherein said order designator comprises an indicator of an object upon which said digital image of said second physical object to be combined with said at least a portion of said digital image of said first physical object is to be rendered.

22. The method of processing an order for a product having visual content of claim 13, wherein said delivery instruction comprises a selected one of an email address, a telephone number, a postal address, and an address corresponding to a physical location.

23. The method of processing an order for a product having visual content of claim 13, wherein said delivery instruction comprises a selected one of delivery to a purchaser and delivery to a third party.

24. The method of processing an order for a product having visual content of claim 13, wherein said step of transmitting said message to a receiving address comprises transmission of an electronic message.

25. The method of processing an order for a product having visual content of claim 24, wherein said electronic message is a selected one of an email message and a MMS message.

26. The method of processing an order for a product having visual content of claim 13, further comprising the step of marking said unique authenticator as a used, no longer valid, authenticator.

27. A system for producing products having visual content, comprising:
   an authenticator generator configured to generate one or more unique authenticators;
   a memory module comprising a module configured to record one or more valid unique authenticators and a module configured to record one or more used, no longer valid unique authenticators;
   a message receiver and decoder module configured to receive an electronic message communicated by cellular telephone or mobile telephone and to extract from said electronic message:
      a digital image of a first physical object, at least a portion of said digital image of said first physical object to be incorporated into a product, said product comprising at least a portion of a digital image of a second physical object;
      an order designator comprising a prearranged alphanumeric code used to designate a specific product to be produced;
      a delivery instruction; and
      an indicator portion comprising a purported unique authenticator;
   an authenticator comparison module configured to compare said purported unique authenticator against said one or more valid unique authenticators, to produce a state designated valid if said purported unique authenticator is found among said one or more valid unique authenticators, and otherwise to produce a state designated invalid;
   an authenticator updating module configured to change the status of a matched valid unique authenticator in memory to a used, no longer valid unique authenticator in response to the designation of a purported unique authenticator as valid; and
   an order fulfillment module configured to produce a completed physical product comprising at least a portion of said digital image of said first physical object combined with at least a portion of said digital image of said second physical object rendered thereon, and configured to send said completed product according to said delivery instruction.

28. The system for producing products having visual content of claim 27, wherein said one or more unique authenticators comprise one or more alphanumeric characters that are compatible with the keypad entry system used a mobile telephone.

29. The system for producing products having visual content of claim 27, wherein said one or more unique authenticators comprise alphanumeric characters provided by use of a selected one of a keyboard, a touchscreen, a stylus, a light pen, a mouse, and a voice command.

30. The system for producing products having visual content of claim 27, further comprising a communication module configured to send a reply message to a transmitter of a message comprising an indicator portion that contains a purported unique authenticator that produces a state designated invalid.

31. The system for producing products having visual content of claim 27, wherein said digital image of said first physical object is a digital image recorded using a selected one of a digital camera, a digital camera portion of a mobile telephone, a digital camera attached to a personal computer, a digital camera attached to a laptop computer, and a mobile device comprising a digital camera.

32. The system for producing products having visual content of claim 27, wherein said order designator comprises an indicator of said digital image of said second physical object to be combined with said at least a portion of said digital image of said first physical object to be incorporated into said product.

33. The system for producing products having visual content of claim 27, wherein said order designator comprises an indicator of an object upon which said digital image of said second physical object to be combined with said at least a portion of said digital image of said first physical object is to be rendered.

34. The system for producing products having visual content of claim 27, wherein said delivery instruction comprises a selected one of an email address, a telephone number, a postal address, and an address corresponding to a physical location.

35. The system for producing products having visual content of claim 27, wherein said delivery instruction comprises a selected one of delivery to a purchaser and delivery to a third party.

36. The system for producing products having visual content of claim 27, wherein said electronic message is a selected one of an email message and a MMS message.

37. The system for producing products having visual content of claim 27, further comprising a transaction processing module configured to issue a unique authenticator in exchange for a monetary payment.

38. The system for producing products having visual content of claim 37, wherein said monetary payment is a selected one of a payment in cash money, a payment by credit card or by debit card, a payment by transfer from an internet account, and a commitment to make payment against an existing line of credit.

39. A method of processing an order for a product having visual content, comprising the steps of:
   providing a system comprising:
      an authenticator generator configured to generate one or more unique authenticators;
      a memory module comprising a module configured to record one or more valid unique authenticators and a module configured to record one or more used, no longer valid unique authenticators;
      a message receiver and decoder module configured to receive an electronic message communicated by cellular telephone or mobile telephone and to extract from said electronic message:
         a digital image of a first physical object, at least a portion of said digital image of said first physical object to be incorporated into a product, said product comprising at least a portion of a digital image of a second physical object;

an order designator comprising a prearranged alphanumeric code used to designate a specific product to be produced;
a delivery instruction; and
an indicator portion comprising a purported unique authenticator;
an authenticator comparison module configured to compare said purported unique authenticator against said one or more valid unique authenticators, to produce a state designated valid if said purported unique authenticator is found among said one or more valid unique authenticators, and otherwise to produce a state designated invalid;
an authenticator updating module configured to change the status of a matched valid unique authenticator in memory to a used, no longer valid unique authenticator in response to the designation of a purported unique authenticator as valid; and
an order fulfillment module configured to produce a completed physical product comprising at least a portion of said digital image of said first physical object combined with at least a portion of said digital image of said second physical object rendered thereon, and configured to send said completed product according to said delivery instruction;
providing a unique authenticator;
receiving a message communicated by cellular telephone or mobile telephone comprising:
a digital image of a first physical object, at least a portion of said digital image of said first physical object to be incorporated into a product, said product comprising at least a portion of a digital image of a second physical object;
an order designator comprising a prearranged alphanumeric code used to designate a specific product to be ordered;
a delivery instruction; and
an indicator portion comprising said unique authenticator;
comparing said unique authenticator against a list of one or more valid unique authenticators, to produce a state designated valid if said unique authenticator is found in the list of unique authenticators, and otherwise to produce a state designated invalid;
in response to a state designated as valid, performing the steps of:
processing said digital image according to said order designator to produce a product; and
delivering said product according to said delivery instruction;
whereby a completed product comprising at least a portion of said digital image of said first physical object combined with at least a portion of said digital image of said second physical object is produced and sent according to said delivery instruction.

* * * * *